United States Patent
Huo et al.

(10) Patent No.: US 10,557,770 B2
(45) Date of Patent: Feb. 11, 2020

(54) PRESSURE SENSOR WITH IMPROVED STRAIN GAUGE

(71) Applicant: Sensata Technologies, Inc., Attleboro, MA (US)

(72) Inventors: Shihong Huo, Bedford, MA (US); Eric A. Wolf, Norwood, MA (US); Neil S. Petrarca, Warwick, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 140 days.

(21) Appl. No.: 15/704,797

(22) Filed: Sep. 14, 2017

(65) Prior Publication Data

US 2019/0078953 A1 Mar. 14, 2019

(51) Int. Cl.
*G01L 9/00* (2006.01)

(52) U.S. Cl.
CPC .................. *G01L 9/0055* (2013.01)

(58) Field of Classification Search
CPC .............................. G01L 9/0055; G01L 9/06
USPC .......................................................... 73/727
See application file for complete search history.

(56) References Cited

U.S. PATENT DOCUMENTS

| | | | |
|---|---|---|---|
| 4,072,058 A | 2/1978 | Whitehead, Jr. | |
| 4,131,088 A | 12/1978 | Reddy | |
| 4,287,772 A | 9/1981 | Mounteer et al. | |
| 4,347,745 A | 9/1982 | Singh | |
| 4,400,681 A | 8/1983 | Brown et al. | |
| 4,462,018 A * | 7/1984 | Yang | G01L 19/148 338/3 |
| 4,771,427 A | 9/1988 | Tulpule et al. | |
| 4,817,362 A * | 4/1989 | Archer | G01B 7/002 33/561 |
| 4,825,876 A | 5/1989 | Beard | |
| 4,888,662 A | 12/1989 | Bishop | |
| 4,903,164 A | 2/1990 | Bishop et al. | |
| 4,967,605 A * | 11/1990 | Okada | G01L 1/18 73/514.33 |
| 5,060,108 A | 10/1991 | Baker et al. | |
| 5,101,659 A | 4/1992 | Takeuchi | |
| 5,101,665 A | 4/1992 | Mizuno | |
| 5,144,843 A | 9/1992 | Tamura et al. | |
| 5,173,766 A | 12/1992 | Long et al. | |
| 5,181,417 A | 1/1993 | Nishida et al. | |
| 5,184,107 A | 2/1993 | Maurer | |
| 5,184,515 A | 2/1993 | Terry et al. | |
| 5,209,121 A | 5/1993 | Hafner | |

(Continued)

FOREIGN PATENT DOCUMENTS

| | | |
|---|---|---|
| CN | 103454032 A | 12/2013 |
| DE | 4234289 C1 | 11/1993 |

(Continued)

*Primary Examiner* — Nathaniel T Woodward
(74) *Attorney, Agent, or Firm* — Burns & Levinson LLP; Joseph M. Maraia; Daniel J. McGrath (57) ABSTRACT

An apparatus senses a pressure of a fluid from a fluid medium. The apparatus has a port body with a peripheral wall surrounding an interior channel. The interior channel extends between a diaphragm on the port body and an opening for receiving the fluid. A strain gauge is disposed on the port body. The strain gauge has two or more resistors connected between input/output pads and ground pads. The resistors are spaced substantially equidistant from the ground pad to reduce mobile ion migration.

20 Claims, 9 Drawing Sheets

(56) References Cited

U.S. PATENT DOCUMENTS

| | | | |
|---|---|---|---|
| 5,222,397 A | 6/1993 | Kodama | |
| 5,231,301 A | 7/1993 | Peterson et al. | |
| 5,284,107 A | 2/1994 | Milne et al. | |
| 5,295,307 A * | 3/1994 | Archer | G01B 7/002 |
| | | | 33/558 |
| 5,331,857 A | 7/1994 | Levine et al. | |
| 5,349,865 A | 9/1994 | Kavli et al. | |
| 5,425,371 A | 6/1995 | Mischenko | |
| 5,448,444 A | 9/1995 | Provenzano et al. | |
| 5,457,988 A | 10/1995 | Delatorre | |
| 5,587,535 A | 12/1996 | Sasaki et al. | |
| 5,625,151 A | 4/1997 | Yamaguchi | |
| 5,629,486 A | 5/1997 | Viduya et al. | |
| 5,665,921 A | 9/1997 | Gerst et al. | |
| 5,741,975 A | 4/1998 | Vaughn, II et al. | |
| 5,802,912 A | 9/1998 | Pitzer et al. | |
| 5,866,822 A * | 2/1999 | Willig | B60T 7/042 |
| | | | 73/719 |
| 5,869,766 A | 2/1999 | Cucci et al. | |
| 6,033,544 A | 3/2000 | Demers et al. | |
| 6,050,145 A | 4/2000 | Olson et al. | |
| 6,070,883 A | 6/2000 | Marto | |
| 6,119,524 A | 9/2000 | Kobold | |
| 6,204,594 B1 | 3/2001 | Ingham | |
| 6,351,998 B1 | 3/2002 | Hohnstadt et al. | |
| 6,389,903 B1 | 5/2002 | Oba et al. | |
| 6,411,038 B2 | 6/2002 | Murai et al. | |
| 6,439,058 B1 | 8/2002 | Aratani et al. | |
| 6,453,747 B1 | 9/2002 | Weise et al. | |
| 6,487,911 B1 | 12/2002 | Frackelton et al. | |
| 6,536,287 B2 | 3/2003 | Beekhuizen et al. | |
| 6,539,787 B1 | 4/2003 | Murai et al. | |
| 6,568,276 B1 | 5/2003 | Ciminelli | |
| 6,700,174 B1 | 3/2004 | Miu et al. | |
| 6,715,357 B2 | 4/2004 | Ishiguro et al. | |
| RE38,557 E | 7/2004 | Englund et al. | |
| 6,763,724 B2 | 7/2004 | DiPaola et al. | |
| 6,876,943 B2 | 4/2005 | Wegerich | |
| 6,945,118 B2 | 9/2005 | Maitland et al. | |
| 6,952,042 B2 | 10/2005 | Stratton et al. | |
| 6,973,837 B2 * | 12/2005 | Barnett | G01D 3/022 |
| | | | 73/765 |
| 7,021,147 B1 | 1/2006 | Subramanian et al. | |
| 7,032,456 B1 | 4/2006 | Amin | |
| 7,114,396 B2 | 10/2006 | Oda et al. | |
| 7,197,937 B2 | 4/2007 | Amore et al. | |
| 7,207,214 B1 | 4/2007 | Wlodarczyk | |
| 7,302,855 B2 | 12/2007 | Oda | |
| 7,316,164 B2 | 1/2008 | Toyoda et al. | |
| 7,383,737 B1 | 6/2008 | Lin et al. | |
| 7,412,894 B2 | 8/2008 | Ueyanagi et al. | |
| 7,518,234 B1 | 4/2009 | Okojie | |
| 7,555,957 B2 | 7/2009 | Toyoda | |
| 7,570,065 B2 | 8/2009 | Harish et al. | |
| 7,578,194 B1 | 8/2009 | Hadjiloucas et al. | |
| 7,726,197 B2 | 6/2010 | Selvan et al. | |
| 7,739,922 B2 | 6/2010 | Inamori | |
| 7,775,119 B1 | 8/2010 | Suminto et al. | |
| 8,024,978 B2 | 9/2011 | Khemet et al. | |
| 8,056,752 B2 | 11/2011 | Carnevali | |
| 8,104,357 B2 | 1/2012 | Schlitzkus et al. | |
| 8,129,624 B2 | 3/2012 | Willner et al. | |
| 8,156,816 B2 | 4/2012 | Willner et al. | |
| 8,164,007 B2 | 4/2012 | Speldrich et al. | |
| 8,215,176 B2 | 7/2012 | Ding et al. | |
| 8,250,909 B2 | 8/2012 | Kern et al. | |
| 8,258,799 B2 * | 9/2012 | Bernstein | F41H 1/02 |
| | | | 324/525 |
| 8,297,115 B2 | 10/2012 | Borgers et al. | |
| 8,429,956 B2 | 4/2013 | Borgers et al. | |
| 8,516,897 B1 | 8/2013 | Jones et al. | |
| 8,627,559 B2 | 1/2014 | Suminto et al. | |
| 8,671,767 B2 | 3/2014 | Kaiser et al. | |
| 8,950,247 B2 | 2/2015 | Borgers et al. | |
| 8,984,949 B2 | 3/2015 | Staiger et al. | |
| 9,003,897 B2 | 4/2015 | Wade et al. | |
| 9,046,436 B2 | 6/2015 | Schlitzkus et al. | |
| 9,063,033 B2 | 6/2015 | Mayer et al. | |
| 9,689,767 B2 * | 6/2017 | Van Der Wiel | G01L 9/0055 |
| 2001/0015402 A1 | 8/2001 | Murai et al. | |
| 2001/0039837 A1 | 11/2001 | Tanizawa et al. | |
| 2002/0029639 A1 | 3/2002 | Wagner et al. | |
| 2002/0073533 A1 | 6/2002 | Park | |
| 2002/0100948 A1 | 8/2002 | Yoshihara et al. | |
| 2003/0033884 A1 | 2/2003 | Beekhuizen et al. | |
| 2003/0150275 A1 | 8/2003 | Wagner et al. | |
| 2004/0007073 A1 | 1/2004 | Weise | |
| 2004/0007074 A1 | 1/2004 | DiPaola et al. | |
| 2004/0007075 A1 | 1/2004 | Ishiguro et al. | |
| 2004/0015282 A1 | 1/2004 | Babala et al. | |
| 2004/0020300 A1 | 2/2004 | Boehler et al. | |
| 2004/0132900 A1 | 7/2004 | Sachdev et al. | |
| 2004/0146719 A1 | 7/2004 | Baney et al. | |
| 2004/0147140 A1 | 7/2004 | Fan et al. | |
| 2004/0200286 A1 | 10/2004 | Mast | |
| 2004/0255682 A1 * | 12/2004 | Petrova | G01L 9/0055 |
| | | | 73/715 |
| 2005/0011273 A1 | 1/2005 | Sasaki et al. | |
| 2005/0103111 A1 | 5/2005 | Imai et al. | |
| 2005/0252300 A1 | 11/2005 | Miller | |
| 2006/0000289 A1 | 1/2006 | Jonsson | |
| 2006/0042393 A1 | 3/2006 | Kaneko et al. | |
| 2006/0042394 A1 | 3/2006 | Kosh et al. | |
| 2006/0042395 A1 | 3/2006 | Lepine et al. | |
| 2006/0053894 A1 | 3/2006 | Kunda et al. | |
| 2006/0090566 A1 | 5/2006 | Oda | |
| 2006/0123887 A1 | 6/2006 | Dordet | |
| 2006/0214202 A1 | 9/2006 | Zorich et al. | |
| 2006/0278012 A1 | 12/2006 | Fujimoto et al. | |
| 2007/0113667 A1 * | 5/2007 | Stratton | G01K 5/52 |
| | | | 73/755 |
| 2007/0148788 A1 | 6/2007 | Hsieh et al. | |
| 2007/0154631 A1 | 7/2007 | Sachdev et al. | |
| 2007/0202628 A1 | 8/2007 | Wuertz | |
| 2007/0205776 A1 | 9/2007 | Harish et al. | |
| 2008/0148860 A1 | 6/2008 | Murakami et al. | |
| 2008/0222884 A1 | 9/2008 | Bradley et al. | |
| 2008/0262584 A1 | 10/2008 | Bottomley et al. | |
| 2009/0071260 A1 | 3/2009 | Speldrich | |
| 2009/0075529 A1 | 3/2009 | Johnston et al. | |
| 2009/0282926 A1 | 11/2009 | Hauer et al. | |
| 2009/0315864 A1 | 12/2009 | Silverbrook et al. | |
| 2009/0320576 A1 | 12/2009 | Borgers et al. | |
| 2010/0052578 A1 | 3/2010 | Kim | |
| 2010/0192696 A1 | 8/2010 | Schlitzkus et al. | |
| 2010/0219487 A1 | 9/2010 | Donis | |
| 2010/0239109 A1 | 9/2010 | Lutz et al. | |
| 2010/0267291 A1 | 10/2010 | Chabineau-Lovgren et al. | |
| 2010/0281994 A1 | 11/2010 | Brown et al. | |
| 2011/0088480 A1 | 4/2011 | Koehler et al. | |
| 2011/0108322 A1 | 5/2011 | Kaiser | |
| 2011/0153277 A1 | 6/2011 | Morath | |
| 2011/0290030 A1 | 12/2011 | Willner et al. | |
| 2011/0320158 A1 | 12/2011 | Steckenreiter et al. | |
| 2012/0067130 A1 | 3/2012 | Kaiser et al. | |
| 2012/0227477 A1 | 9/2012 | Borgers et al. | |
| 2013/0052936 A1 | 2/2013 | Jordan | |
| 2013/0073189 A1 | 3/2013 | Korenaga et al. | |
| 2013/0192379 A1 | 8/2013 | Petrarca | |
| 2013/0248024 A1 | 9/2013 | Dunn et al. | |
| 2013/0264664 A1 | 10/2013 | Nimura et al. | |
| 2013/0336511 A1 | 12/2013 | Underbrink et al. | |
| 2014/0130585 A1 | 5/2014 | Borgers et al. | |
| 2014/0130586 A1 | 5/2014 | Zwollo et al. | |
| 2014/0137654 A1 * | 5/2014 | Zwijze | G01L 19/0092 |
| | | | 73/727 |
| 2014/0144206 A1 | 5/2014 | Uehlin et al. | |
| 2014/0219713 A1 | 8/2014 | Balsells et al. | |
| 2014/0260648 A1 | 9/2014 | Aoyama et al. | |
| 2014/0338448 A1 | 11/2014 | Ashino | |
| 2015/0135853 A1 | 5/2015 | McNeal et al. | |
| 2015/0377729 A1 | 12/2015 | Hio et al. | |
| 2016/0025581 A1 * | 1/2016 | Kazama | G01L 9/0054 |
| | | | 73/721 |

(56) References Cited

U.S. PATENT DOCUMENTS

| | | |
|---|---|---|
| 2016/0133762 A1 | 5/2016 | Blasco Claret |
| 2016/0265998 A1 | 9/2016 | Lavado et al. |
| 2016/0282205 A1 | 9/2016 | Huo et al. |

FOREIGN PATENT DOCUMENTS

| | | |
|---|---|---|
| DE | 4407212 C1 | 8/1995 |
| DE | 102004048367 A1 | 4/2006 |
| EP | 085584 A1 | 8/1983 |
| EP | 1074827 A2 | 2/2001 |
| EP | 1211497 A2 | 6/2002 |
| EP | 1560012 A1 | 8/2005 |
| EP | 1826543 A2 | 8/2007 |
| EP | 2390641 A2 | 11/2011 |
| EP | 2620757 A1 | 7/2013 |
| EP | 2637008 A2 | 9/2013 |
| EP | 2848908 A1 | 3/2015 |
| EP | 3315936 A1 | 5/2018 |
| FR | 2791430 A1 | 9/2000 |
| GB | 2066590 A | 7/1981 |
| JP | 406037334 | 2/1994 |
| JP | 2010256187 A | 11/2010 |
| WO | WO-0242720 A2 | 5/2002 |
| WO | WO-2003100371 A1 | 12/2003 |
| WO | WO-2006102460 A1 | 9/2006 |
| WO | WO-2011155054 A1 | 12/2011 |
| WO | WO-2013083320 A1 | 6/2013 |
| WO | WO-2013110045 A1 | 7/2013 |
| WO | WO-2014132730 A1 | 9/2014 |

\* cited by examiner

FIG. 1

(PRIOR ART)

FIG. 2

(PRIOR ART)

PRESSURE SENSOR WITH IMPROVED STRAIN GAUGE

FIELD OF THE INVENTION

The subject disclosure relates to pressure sensing devices and more particularly to pressure sensors with improved strain gauge performance.

BACKGROUND OF THE INVENTION

Microfused silicon strain gauge (MSG) pressure sensors are widely used throughout a number of industries. In the automotive industry, MSGs are used for applications ranging from brake, transmission, and fuel pressure sensors, to occupant weight force sensing. Such pressure sensors typically include silicon strain gauge elements which are glass-bonded to a stainless steel diaphragm of a steel port body. Wheatstone bridge, or other strain gauge configurations are sometimes employed to yield a linear voltage output which is directly proportional to the applied pressure on the steel diaphragm by calibration.

However, inaccuracies tend to occur in typical MSGs in a number of ways. For example, when temperature rises above 110 Celsius, chemical decomposition tends to occur within the glass generating mobile ions. When the steel port body is grounded, the mobile ions will flock towards the resistors closest to the supply voltage. Disparate ion accumulate across the resistors can lead to sensor signal drift. Further, designs which seek to avoid sensor signal drift can result in sensors with reduced sensitivity, unfavorable resistor or pad positioning, or other inaccuracies.

SUMMARY OF THE INVENTION

In light of the needs described above, in at least one aspect, there is a need for a cost effective pressure sensor and strain gauge which can accurately sense pressure without significant signal drift.

In at least one aspect the subject technology relates to an apparatus for sensing a pressure of a fluid from a fluid medium. The apparatus has a port body with a peripheral wall surrounding an interior channel for receiving the fluid from the fluid medium, the interior channel extending between the fluid medium and a diaphragm on the port body. A strain gauge is affixed to the port body by a glass substrate. The strain gauge has a first resistor electrically connected between a first input/output (I/O) pad and a ground pad, a second resistor electrically connected between a second I/O pad and the ground pad, a third resistor electrically connected between a third I/O pad and the ground pad, and a fourth resistor electrically connected between a fourth I/O pad and the ground pad. Four current sources each provide a uniform, constant current to one of the I/O pads. A first output is electrically connected between the first I/O pad and the second I/O pad for measuring voltage. A second output electrically connected between the third I/O pad and the fourth I/O pad for measuring voltage. Each resistor is spaced substantially equidistant from the ground pad to urge uniform mobile ion accumulation across the resistors. Further, when the diaphragm experiences pressure from the fluid, the second resistor and the third resistor experience a tension force and the first resistor and fourth resistor experience a compression force.

In another aspect, the subject technology includes an apparatus for sensing a pressure of a fluid from a fluid medium having a port body with a peripheral wall surrounding an interior channel. The interior channel extends between a diaphragm on the port body and an opening for receiving the fluid. A strain gauge is disposed on the port body having a first resistor electrically connected between a first I/O pad and a ground pad, a second resistor electrically connected between a second I/O pad and the ground pad, a third resistor electrically connected between a third I/O pad and the ground pad, and a fourth resistor electrically connected between a fourth I/O pad and the ground pad. Each resistor is substantially equidistant from the ground pad to reduce mobile ion migration and a uniform input is applied through each resistor simultaneously. In some embodiments, the first I/O pad and the second I/O pad are disposed on a first side of the ground pad and the third I/O pad and the fourth I/O pad are disposed on a second side of the ground pad. The I/O pads and the ground pad can be arranged in a parallel row and the resistors can be piezoresistive elements.

In some embodiments, the first resistor and the fourth resistor are positioned adjacent to the peripheral wall and the second resistor and the third resistor are positioned adjacent to the diaphragm, such that fluid in the interior channel causes the first and fourth resistors to experience compression while the second and third resistors experience tension. In some embodiments the first resistor and the fourth resistor are symmetrical to the second resistor and the third resistor about a lateral axis passing through the I/O pads. In some cases, the ground pad is elongated along a longitudinal axis and the first resistor and the second resistor are symmetrical about the longitudinal axis to the fourth resistor and the third resistor.

In at least one aspect, the subject technology relates to an apparatus for sensing a pressure of a fluid from a fluid medium with a strain gauge. The strain gauge has a first resistor electrically connected between a first I/O pad and a ground pad, a second resistor electrically connected between a second I/O pad and the ground pad, and a first output electrically connected between the first I/O pad and the second I/O pad. The first and second resistors are spaced from the ground pad to urge uniform mobile ion accumulation across the first and second resistors. In some embodiments, the resistors are spaced substantially equidistant from the ground pad. A constant current can be applied through the first resistor and the second resistor, the constant current being uniform. In some cases, the constant current is applied to the first resistor via the first I/O pad and to the second resistor via the second I/O pad, the output pad measuring a change in voltage between the first I/O pad and the second I/O pad.

In some embodiments, the first I/O pad, the second I/O pad, and the ground pad are aligned along a lateral axis, the first resistor and the second resistor being symmetrical about the lateral axis. In some embodiments a constant voltage is applied through the first resistor and the second resistor, the constant voltage being uniform. The strain gauge can further include a third resistor electrically connected between a third I/O pad and the ground pad, a fourth resistor electrically connected between a fourth I/O pad and the ground pad, and a second output electrically connected between the third I/O pad and the fourth I/O pad.

In some embodiments, the apparatus includes a port body defining an interior channel for receiving the fluid from the fluid medium and the strain gauge is disposed on the port body. The port body can be conductive and grounded. The first resistor and the fourth resistor can be positioned adjacent to a peripheral wall of the port body surrounding the interior channel such that fluid in the channel causes the first resistor and the fourth resistor to experience a compression force. Further, the second resistor and the third resistor can be positioned adjacent to a diaphragm within the port body, the diaphragm being exposed to the interior channel, such that fluid in the channel causes the second resistor and the third resistor to experience a tension force.

In some embodiments, the first resistor and the fourth resistor form a first resistor pair, the second resistor and the third resistor form a second resistor pair, and the first resistor pair and the second resistor pair are symmetrical about a lateral axis. In other embodiments, the first resistor and the second resistor form a first resistor pair, the third resistor and the fourth resistor form a second resistor pair, and the first resistor pair and the second resistor pair are symmetrical about a longitudinal axis.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes many of the prior art problems associated with pressure sensors. In brief summary, the subject technology provides a pressure sensor and corresponding strain gauge that significantly reduce signal drift as compared to prior art sensors. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Further, resistors, and other features describe herein which are numbered, are numbered only to facilitate a discussion of those features with respect to one another. The numbers of each component do not refer to any particular order (e.g. where one must become before two) and in various embodiments any number of one component can switch numbers with another numbered component. For example, if a first and second resistor are described, the second resistor could just as appropriately be deemed the first resistor while the resistor formerly called the first resistor is called the second resistor. Additionally, when a number of similar components are identified with like reference numerals (e.g. two resistors are given reference numerals 140a and 140b) the components are sometimes referred to collectively with a single reference numeral (e.g. just 140).

Figure 1:
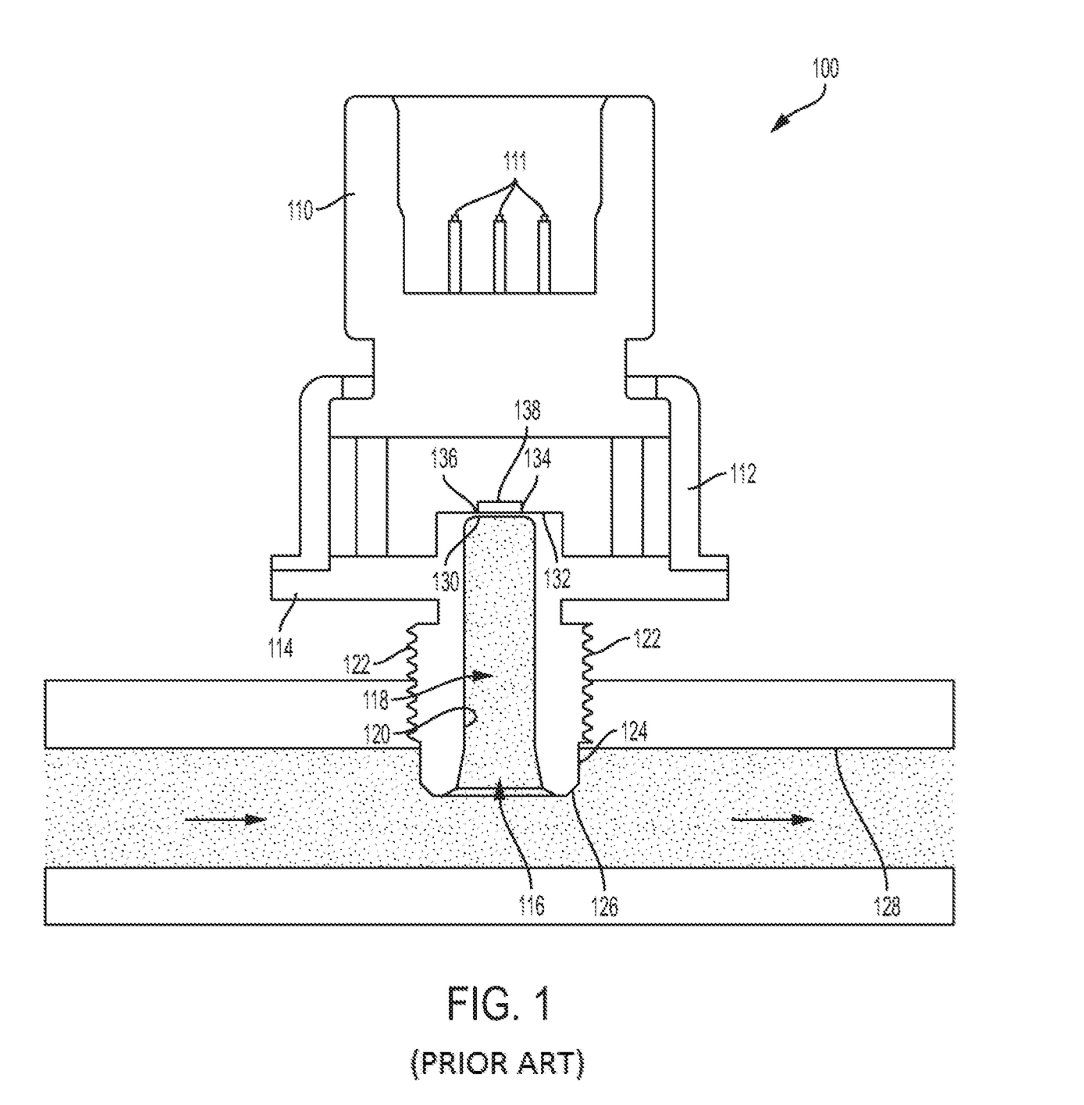
FIG. 1 is a cross sectional view of a prior art pressure sensor.

Referring now to FIG. 1, a cross sectional view of a prior art pressure sensor 100 is shown. The pressure sensor is configured for use within various applications, such as a motorized vehicle. For example, the pressure sensor 100 can measure the pressure of transmission fluid, brake fluid, or engine oil.

A connector 110, a housing 112, and a solid steel port body 114 are coupled together to enclose the other components of the pressure sensor 100. A distal opening 116 in the port body 114 allows fluid to flow from a fluid medium into an interior channel 118 defined by peripheral walls 120 of the port body 114. Ridges 122 on the exterior 124 of the port body 114 allow fixation of the distal end 126 of the port body 114 to a structure 128 surrounding the fluid medium, keeping the interior channel 118 fluidly connected to the fluid medium.

The port body 114 also includes a diaphragm 130 at a proximate end 132 of the interior channel 118. The diaphragm 130 is formed from a steel wall that is relatively thinner as compared to the peripheral walls 120 of the port body 114. As fluid from the pressure medium enters and fills the interior channel 118, fluid pressure causes the diaphragm 130 to flex. A strain gauge 134, such as a microfused silicon strain gauge (MSG), is affixed to the top 136 of the diaphragm 130, for example, by an adhesive or substrate layer. The strain gauge 134 includes a number of sense elements, such as resistors or piezoresistive elements which change resistance as they flex in conjunction with the flexing of the diaphragm 130. The resistance of the resistors is relied upon to determine the pressure within the interior channel 118, and thus, pressure within the pressure medium. This resistance can be calculated, for example, by configuring the strain gauge 134 and corresponding resistors to form a Wheatstone bridge. Connector pins 111 allow signals for the strain gauge 134 to be delivered to external electronics (not shown herein).

Figure 2:
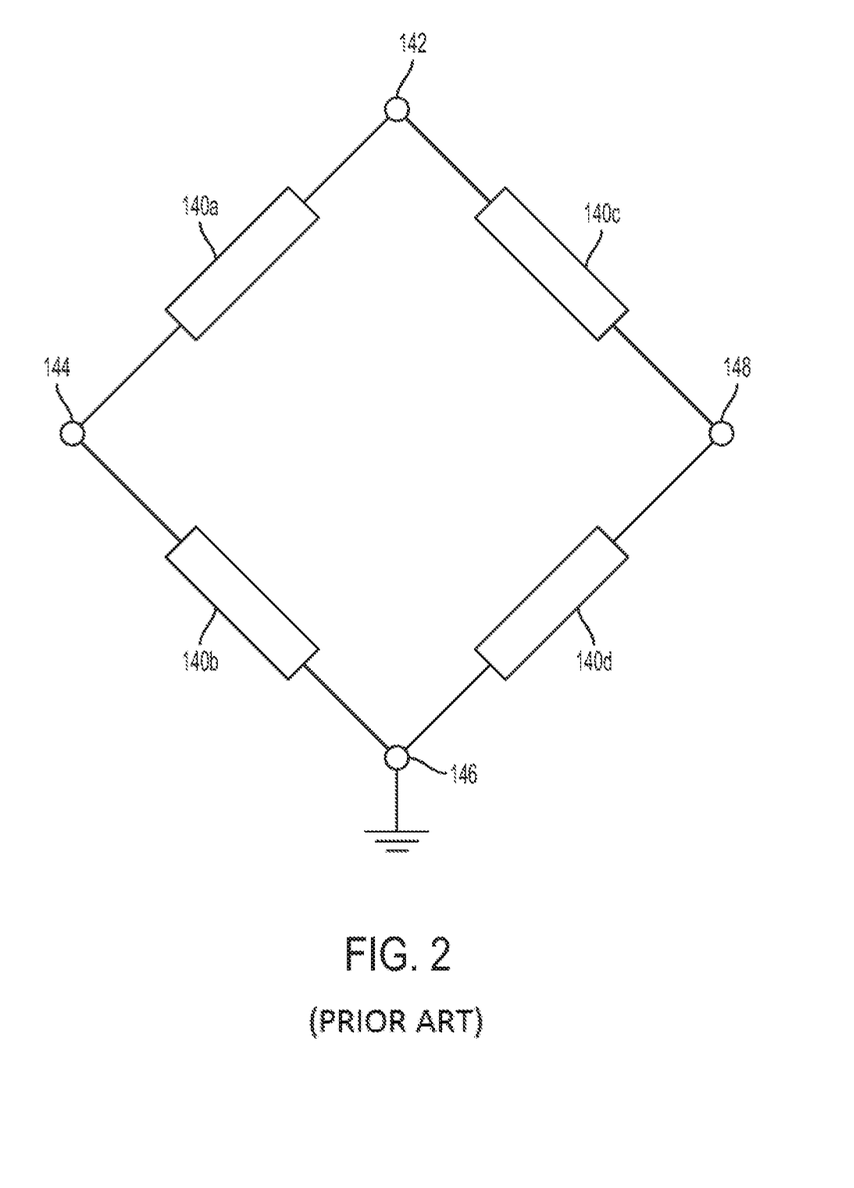
FIG. 2 is a schematic view of a prior art strain gauge forming a Wheatstone bridge.

Referring now to FIG. 2, a schematic of the circuitry of a prior art strain gauge 134 forming a Wheatstone bridge is shown. As described above, the strain gauge 134 and related processing circuitry act to calculate a pressure based on the resistance of the resistors 140. For example, a voltage supply 142 applies a voltage to the Wheatstone bridge. On one side of the Wheatstone bridge, shown here on the left, an electrical connection is formed between the voltage supply 142, a first bridge output voltage 144, and a ground pad 146. A first resistor 140a is disposed on the electrical connection between the voltage supply 142 and the bridge output voltage 144 and a second resistor 140b is disposed between the first bridge output voltage 144 and the ground pad 146. On the right side of the Wheatstone bridge, the voltage supply 142 is electrically connected to a second bridge output voltage 148 and the ground pad 146. A third resistor 140c is disposed on the electrical connection between the voltage supply 142 and the second bridge output voltage 148 and a fourth resistor 140d is disposed between the second bridge output voltage 148 and the ground pad 146.

As pressure is applied to the diaphragm 130, flexure of the diaphragm 130 causes a change in resistance to one or more of the resistors 140. A constant voltage is being input into the strain gauge 134 via the voltage supply 142. Therefore a change in resistance of one of the resistors 140 will cause a corresponding change in one of the bridge output voltages 144, 148. The change in output voltage is used to calculate the amount of flexure in the diaphragm and corresponding pressure change within the channel 118, and therefore, within the fluid medium. Notably, the term "Wheatstone bridge" as used herein is used merely to refer to an arrangement of components, such as contact pads and resistors 140, which work to generate a signal which can be relied upon to determine the resistance of one or more resistors 140. The processing circuitry which is relied upon to ultimately determine pressure may be separate from the strain gauge 134 shown herein.

Figure 3:
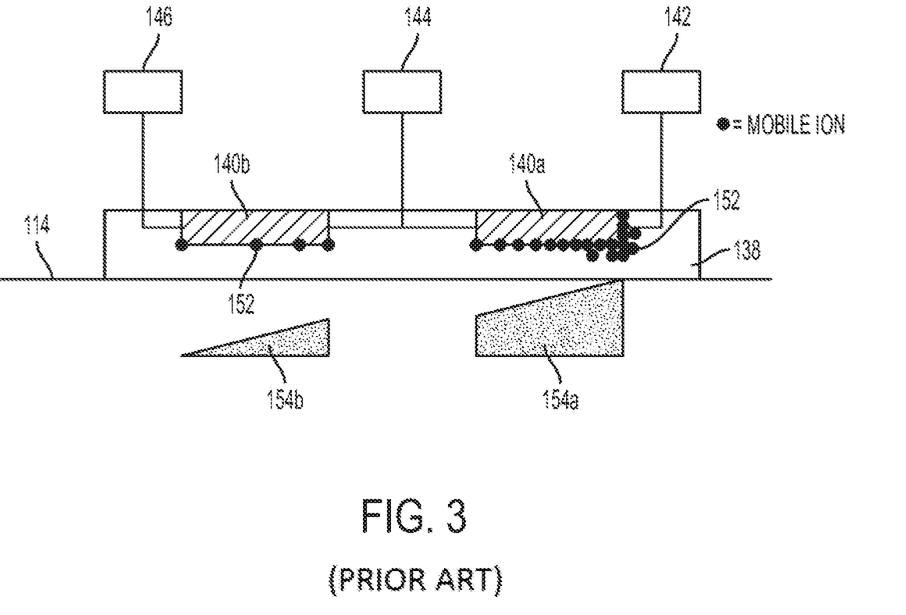
FIG. 3 is a block diagram showing the operation of a prior art Wheatstone bridge in operation.

Referring now to FIG. 3, a block diagram showing the operation of a prior art strain gauge 134 is shown. In the example given, the strain gauge 134 is operating in a harsh environment, such as part of an automotive application, and is subject to a high temperature (i.e. above 100 degrees Celsius). In some cases, the temperature may even reach a very high temperature (i.e. above 110 degrees Celsius) or greater. Due to the layout of the Wheatstone bridge, as shown in FIG. 2, the first resistor 140a is positioned relatively closer to the supply voltage 142 as compared to the second resistor 140b. Meanwhile the second resistor 140b is positioned relatively closer to the ground 146, as compared to the first resistor 140a.

Still referring to FIG. 3, the harsh environment has required the vehicle to continuously run, subjecting the strain gauge 134 to a high temperature. The strain gauge 134 has remained powered on with the steel port grounded, resulting in the creation of a number of mobile ions 152. The mobile ions 152 will accumulate on the resistors 140, and areas within those resistors 140 that are closest to the supply voltage 142 and furthest from the ground pad 146. Disparate mobile ions 152 accumulate across the resistors 140 will result in a mobile ion distribution with an unbalanced resistance change which can create a charging effect on the resistors 140 leading to sensor signal drift.

In the example shown in FIG. 3, the distribution graphs 154a, 154b (generally 154) under each resistor 140a, 140b represent the strength of the mobile ion distribution across those resistors 140a, 140b. The height of the graphical depiction of the mobile ion distribution 154 corresponds to the average total mobile ion 152 accumulation at the corresponding area of the resistor 140 (i.e. the area of each resistor 140 directly above that portion of the distribution graph 154. The first resistor 140a being closer to the voltage supply 142 and further from the ground pad 146, has a greater mobile ion accumulation, and thus a higher mobile ion distribution 154a, than the mobile ion distribution 154b of the second resistor 140b. Similarly, the mobile ion distribution graphs 154a, 154b of each resistor 140a, 140b increases according to proximity to the voltage supply 142 and distance from the ground pad 146.

Figure 4:
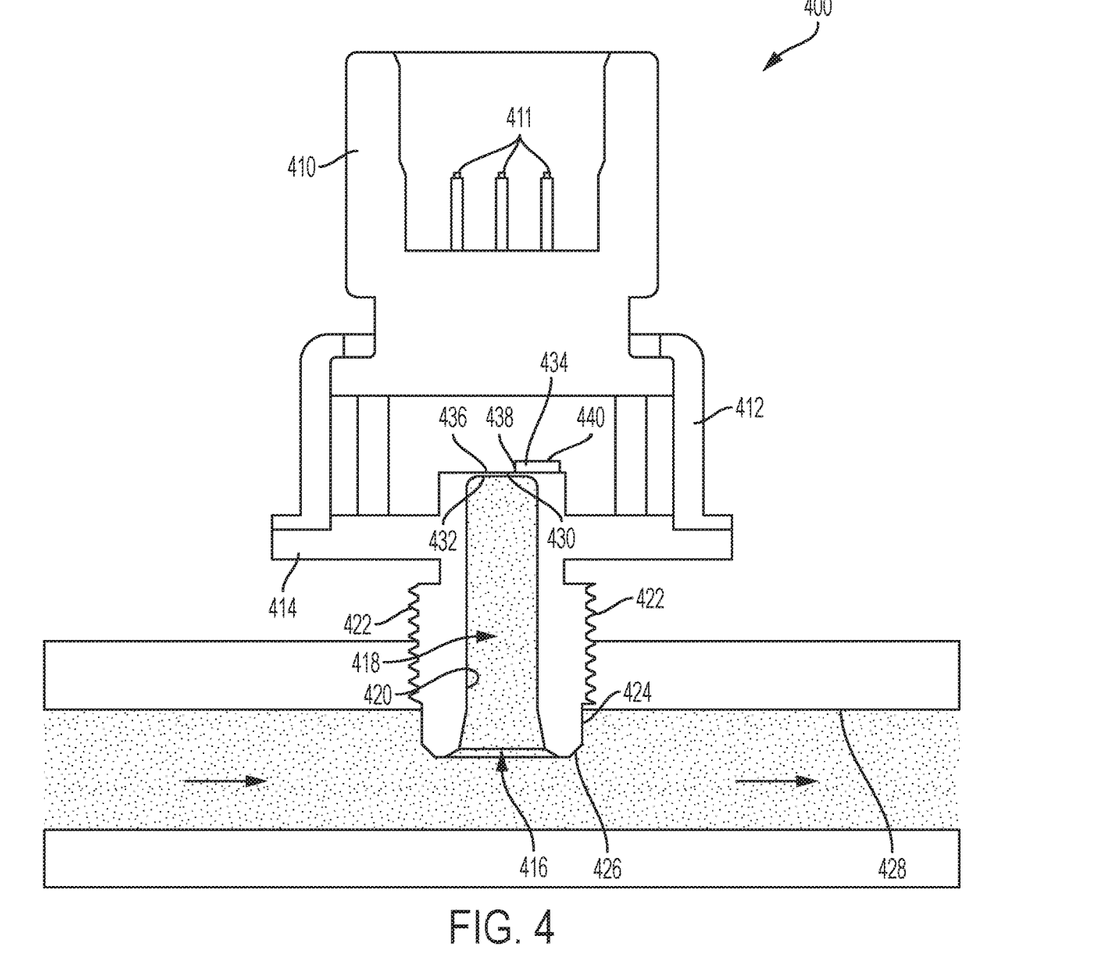
FIG. 4 is a cross sectional view of a strain gauge in accordance with the subject technology.

Referring now to FIG. 4, a cross sectional view of a pressure sensor 400 in accordance with the subject technology is shown. A connector 410, a housing 412, and a solid steel port body 414 are coupled together to enclose the other components of the pressure sensor 400. A distal opening 416 in the port body 414 allows fluid to flow from a fluid medium into an interior channel 418 defined by peripheral walls 420 of the port body 414. Ridges 422 on the exterior 424 of the port body 414 allow fixation of the distal end 426 of the port body 414 to a structure 428 surrounding the fluid medium, keeping the interior channel 418 fluidly connected to the fluid medium.

The port body 414 also includes a diaphragm 430 at a proximate end 432 of the interior channel 418. The diaphragm 430 is formed from a steel wall that is relatively thinner as compared to the peripheral walls 420 of the port body 414. As fluid from the pressure medium enters and fills the interior channel 418, fluid pressure causes the diaphragm 430 to flex, while the peripheral walls 420 of the port body 414 are thick enough to hold their shape. A strain gauge 434, such as an MSG, is affixed to the top 436 of the diaphragm 430, for example, by an adhesive or substrate layer (e.g. a glass substrate 438). The strain gauge 434 includes a number of sense elements, such as resistors 440 (see FIG. 5A) or piezoresistive elements which change resistance as they flex in conjunction with the flexing of the diaphragm 430. The resistance of the resistors 440 is relied upon to determine the pressure within the interior channel 418, and thus, pressure within the pressure medium. The strain gauge 432 can transmit an output signal to external components for (not distinctly shown) for display or processing via connector pins 411. While the pressure sensor 400 has some similar features to the prior art pressure sensor 100, the most significant differences are described and shown herein. Notably, in the embodiment shown, the resistors 440 are directly attached to the port body 414, the only intervening layer being a glass substrate 438 or an adhesive.

In one embodiment, the pressure sensor 400 of the subject technology includes a strain gauge 434 which is positioned half over the diaphragm 430, and half over the thicker peripheral walls 420 of the port body 414. As a result, when the diaphragm 430 flexes, the portion of the strain gauge 434 over the diaphragm 430 is stretched and placed into tension, while the portion of the strain gauge 434 over the relatively inflexible peripheral walls 420 is placed into compression. Accordingly, this causes resistors 440 over the diaphragm 430 to experience a tension force while resistors 440 over the peripheral walls 420 to experience a compression force. As with the pressure sensor 100, resistance of the resistors 440 is relied upon to determine the pressure within the interior channel 118, and thus, pressure within the pressure medium. In the case of the pressure sensor 400, when the resistors 440 are piezoresistive elements, the differential in resistance between the resistors 440 in tension and the resistors 440 in compression can be further relied upon to enhance sensing accuracy.

Figure 5A:
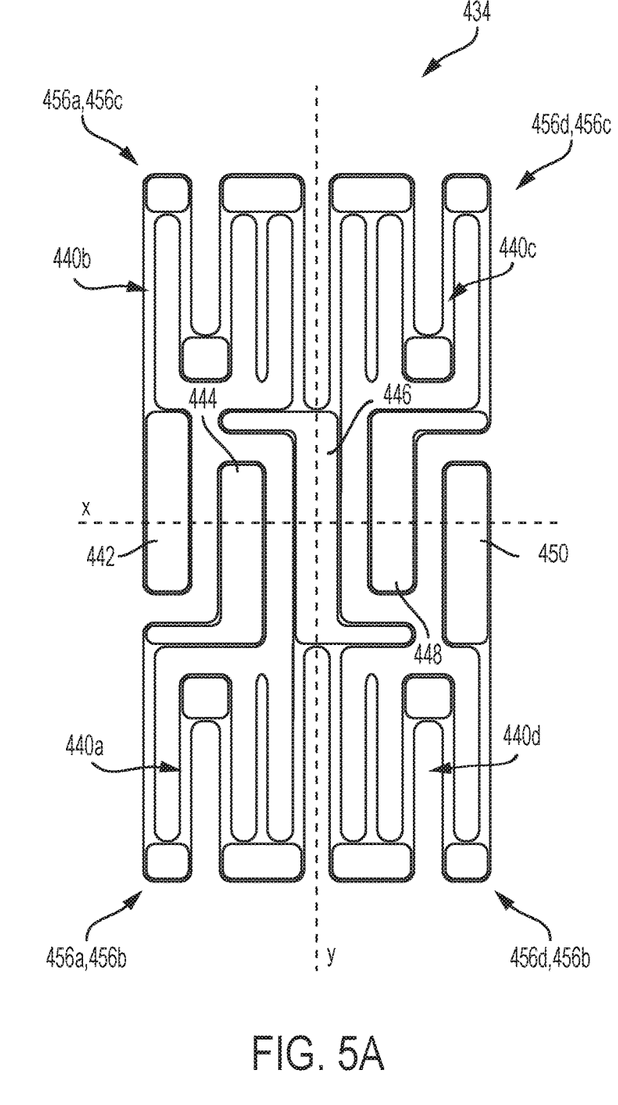
FIG. 5A is a top view of a strain gauge in accordance with the subject technology.
Figure 5B:
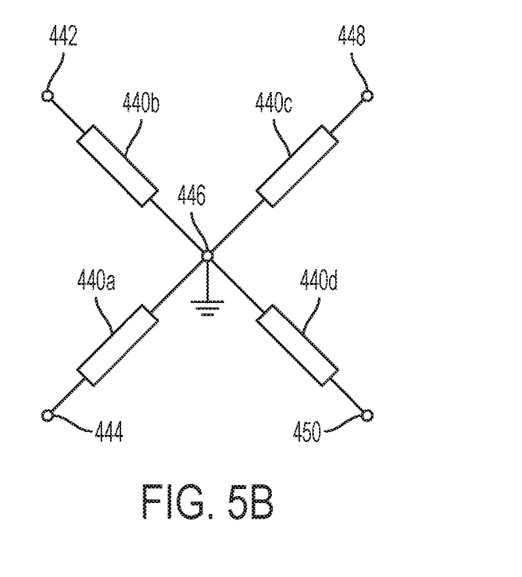
FIG. 5B is a simplified circuit diagram of the strain gauge of FIG. 5A.

Referring now to FIGS. 5A and 5B, a top view of the mechanical configuration of a strain gauge 434, as well as a simplified circuit diagram of a strain gauge 434 in accordance with the subject technology are shown, respectively. While only a strain gauge 434 is shown for simplicity, it should be noted that it is envisioned that the strain gauge 434 will be utilized in accordance with the other components shown and described herein. For example, the strain gauge 434 can be attached to a pressure sensor 400 via a glass substrate 438, as shown in FIG. 4. Fi Still referring to FIGS. 5A-5B, the strain gauge 434 contains four input/output pads (I/O) pads 442, 444, 448, 450 and a centrally positioned ground pad 446. The I/O pads 442, 444, 448, 450 are aligned along a lateral axis "x" and elongated along a longitudinal axis "y", such that they are all parallel along the longitudinal axis y. The longitudinal axis y passes lengthwise through the center of the ground pad 446 while the lateral axis x passes widthwise through the center of the ground pad 446. The strain gauge 434 also includes four resistors 440a, 440b, 440c, 440d (generally 440). A first resistor 440a electrically connects a first I/O pad 444 to the ground pad 446. The first resistor 440a is located on a first side 456a of the longitudinal axis y and a first side 456b of the lateral axis x. A second resistor 440b, located on the first side 456a of the longitudinal axis y and a second side 456c of the lateral axis x, connects the second I/O pad 442 to the ground pad 446. A third resistor 440c, positioned on the second side 456c of the lateral axis x and the second side 456d of the longitudinal axis y, connects the third I/O pad 448 to the ground pad 446. A fourth resistor 440d, positioned on the first side 456b of the first lateral axis x and the second side 456d of the longitudinal axis y, connects the fourth I/O pad 450 to the ground pad 446. The position of the resistors 440, with respect to the x and y axes, can also be described as quadrants. For example, the x and y axes form four quadrants with the first 440a, second 440b, third 440c, and fourth 440d resistors being positioned within the first 456a, 456b, second 456a, 456c, third 456d, 456c, and fourth 456d, 456b quadrants respectively.

The four resistors 440 can also be described as forming two pairs of resistors, the pairs being symmetrical about one or more of the axes x,y. For example, the first resistor 440a and the fourth resistor 440d can form a first resistor pair while the second resistor 440b and the third resistor 440c can form a second resistor pair. In such a case, the first resistor pair and the second resistor pair are symmetrical about the lateral axis x. Similarly, the first resistor 440a and the second resistor 440b can form a first resistor pair while the third resistor 440c and the fourth resistor 440d form a second resistor pair. The first resistor pair and the second resistor pair would then be symmetrical about the longitudinal axis y. In the example shown, there is symmetry between all resistors 440 about the axes. This symmetrical resistor orientation within the strain gauge 434 reduces pressure nonlinearity between the resistors 440. Further, the five pad 442, 444, 446, 448, 450 orientation, with symmetrical I/O pads 442, 444, 448, 450 surrounding the central ground pad 446, eases the wire bonding process, making assembly of the strain gauge 434 quicker and more cost efficient. The symmetrical resistor orientation also allows the resistors to be more easily placed on a desired location of the port body 414. For example, the strain gauge 434 can be placed with the first resistor 440a and fourth resistor 440d are placed the peripheral walls 420 of the strain gauge 434, while the second resistor 440b and third resistor 440c are placed over the diaphragm 430. In this configuration, fluid entering the channel 418 will apply a pressure to the diaphragm 430, causing the first resistor and the fourth resistor 440d to be in compression while the second resistor 440b and third resistor 440c are in compression.

Figure 6:
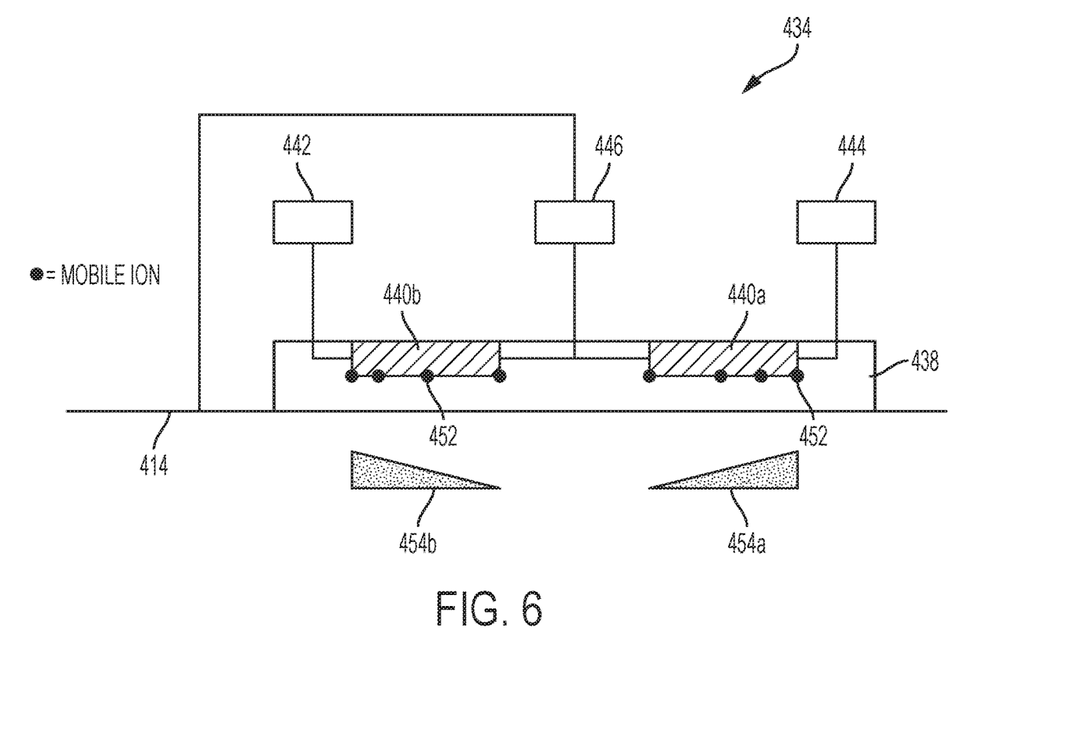
FIG. 6 is a block diagram of the strain gauge of FIG. 5A.

Turning to FIG. 6, a block diaphragm of the strain gauge 434 of FIGS. 5A-5B is shown. In the example given, the strain gauge 434 is operating in a harsh environment, such as part of an automotive application, and is subject to a high temperature (i.e. above 100 degrees Celsius). In some cases, the temperature may even reach a very high temperature (i.e. above 110 degrees Celsius) or greater. The strain gauge 434 and circuitry are affixed to the port body 414 via a glass substrate 438. An input current is being applied to the strain gauge 434 via the I/O pads 442, 444. Due to the layout of the circuitry, the second resistor 440b is positioned substantially equidistant from the ground 446, as compared to the first resistor 440a. Both resistors 440, 440b are also positioned substantially equidistant from their corresponding I/O pad 442, 444. The term "substantially" as used in the phrase "substantially equidistant" herein, is defined as between 0 to 200 micrometers. In the embodiment shown, the port body 414 is a conductive material electrically connected to the ground. Therefore the ground pad 446 of the strain gauge 434 is grounded by a connection between the ground pad 446 and the port body 414.

Still referring to FIG. 6, the harsh environment has resulted in the creation of a number of mobile ions 452. The mobile ions 452 will accumulate on the resistors 440, and areas within those resistors 440, that are closest to supply current from the I/O pads 442, 444 and further from the ground 446. In the example shown in FIG. 6, the first and second resistors 440a, 440b are spaced from the ground pad 446 to urge uniform mobile ion 452 accumulation across the first and second resistors 440a, 440b. In other words, each resistor 440 is spaced substantially equidistant from the ground pad 446 to urge uniform mobile ion 452 accumulation across the resistors 440. Mobile ion 452 accumulation across the first resistor 440a is graphically depicted by mobile ion distribution graph 454a and the mobile ion 452 accumulation across the second resistor 440b is graphically depicted by mobile ion distribution graph 454b. The configuration of each resistor 440 being substantially equidistant from the ground pad 446 reduces mobile ion 452 migration. Thus, the first resistor 440a has approximately the same mobile ion 452 accumulation, and approximately the same mobile ion distribution graph 454a as the mobile ion 452 accumulation and distribution graph 454b for the second resistor 440b. Note that the height of the graphical depictions 454 of the mobile ion distribution 454 corresponds to average total mobile ion 452 accumulation at the corresponding area of each resistor 440a, 440b (e.g. the area of each resistor 440a, 440b at a similar distance from the central ground pad 446). Balanced mobile ion 452 accumulating across the resistors 440a, 440b results in a balanced resistance charge (i.e. the first resistor 440a is reducing at the same rate as the second resistor 440b). This advantageously prevents creation of a charging effect on the resistors 440 and reduces or eliminates sensor signal drift.

Figure 7:
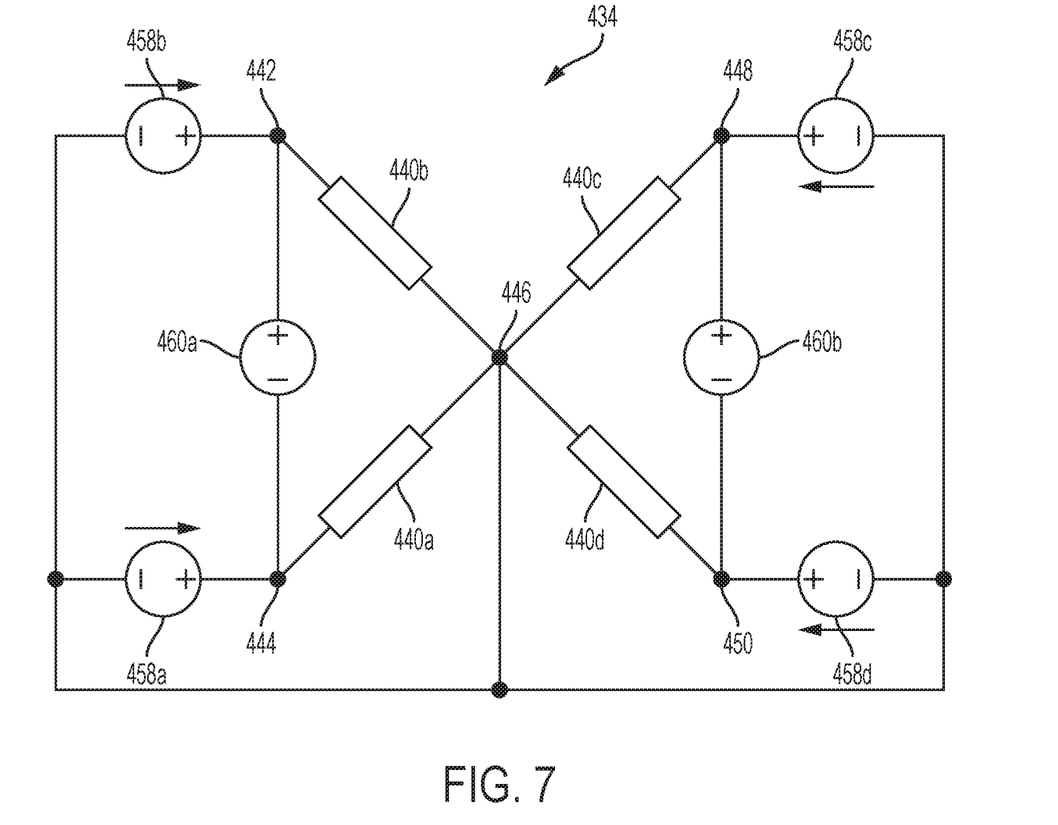
FIG. 7 is a circuit diagram of the strain gauge of FIG. 5A.

Turning to FIG. 7, a more complete circuit diagram of the strain gauge of FIGS. 5A-5B is shown. A first resistor 440a is electrically connected between a first I/O pad 444 and a ground pad 446. A second resistor 440b is electrically connected between a second I/O pad 442 and the ground pad 446. Additionally, a third resistor 440c is electrically connected between a third I/O pad 448 and the ground pad 446, while a fourth resistor 440d is electrically connected between a fourth I/O pad 450 and the ground pad 446. Each resistor 440 is positioned to be substantially equidistant from the ground pad 446 to urge uniform mobile ion 452 accumulation across the resistors 440. Four current sources 458a, 458b, 458c, 458d (generally 458), each provide a uniform, constant current to one of the I/O pads 442, 444, 448, 450. A first output 460a is electrically connected between the first I/O pad 444 and the second I/O pad 442 and a second output 460b is electrically connected between the third I/O pad 448 and the fourth I/O pad 450, the output 460 configured to measure a change in voltage. More specifically, when the resistance of the resistors 440 changes due to pressure, the outputs 460 sense a corresponding voltage change which can be used to calculate pressure. In other embodiments, a constant voltage can be applied as an input, instead of current sources 458, and the outputs 460 can be configured to measure a change in current.

Notably, while an electrical configuration of four resistors 440 is shown, this is for redundancy and only two resistors 440 need to be used in some embodiments. For example, the strain gauge 434 could be configured with only resistors 440a and 440b, output 460a, grounding pad 446, and the first and second I/O pads 442, 444. In some embodiments, the first resistor 440a would be placed above the peripheral walls 420 of the port body 414 such that it would experience a compression force, while the second resistor 440b would be placed above the diaphragm 430 to experience a tension force. The output 460a, would then measure the resistance differential (e.g. by sensing a voltage or current across the circuit) generated when the resistors 440b, 440a were placed in tension and compression, respectively. Similarly, with the four resistor 440 configuration shown, the third resistor 440c could be placed in tension while the fourth resistor 440d is placed in compression, such that the output 460b measures the resistance differential. Therefore having four resistors 440 allows for each pair of resistors (e.g. 440a, 440b and 440c, 440d) to serve as a check on the other pair.

Figure 8A:
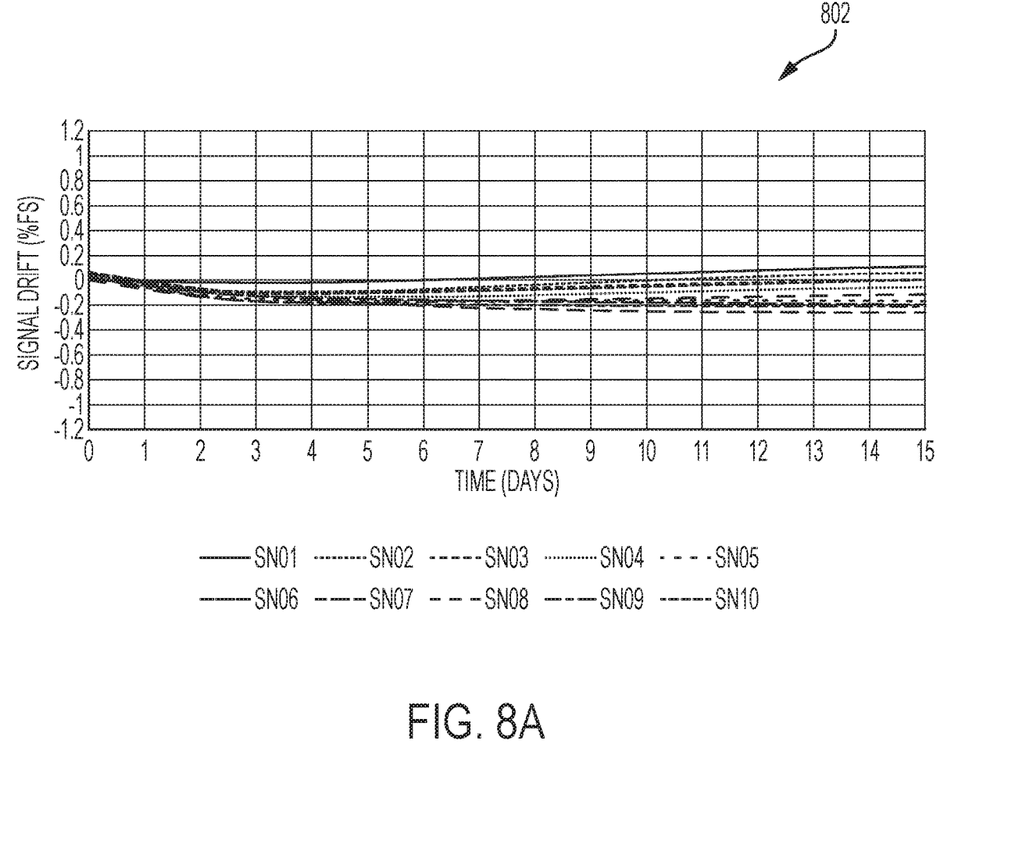
FIG. 8A is a graph showing testing data representing signal drift over time for strain gauges designed in accordance with the subject technology.
Figure 8B:
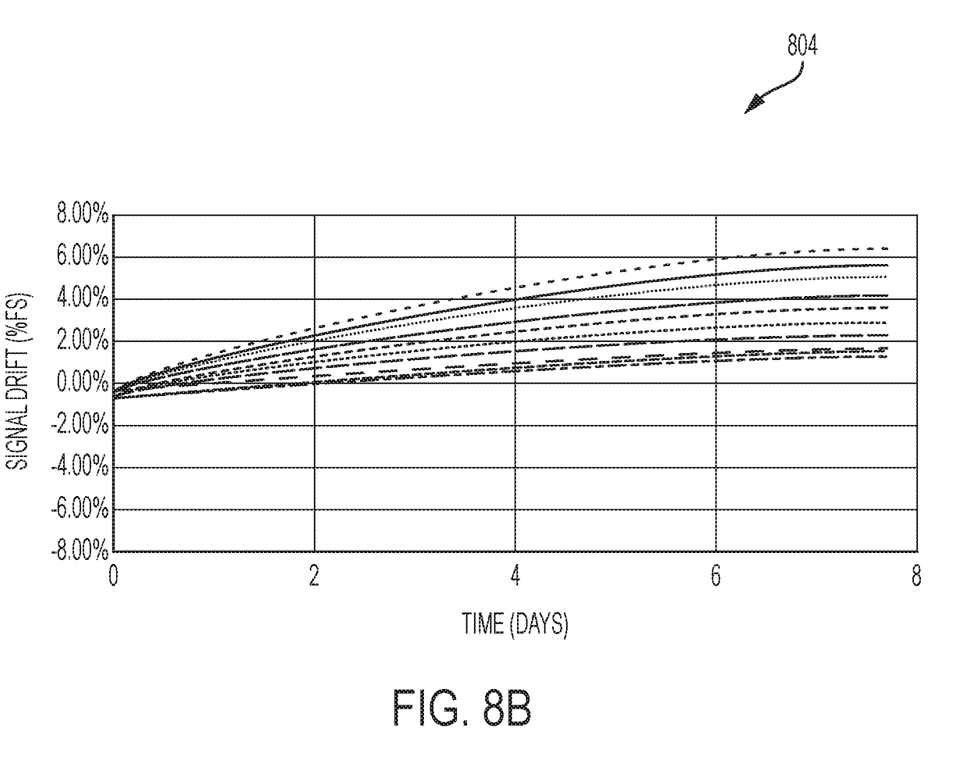
FIG. 8B is a graph showing testing data representing signal drift over time for prior art strain gauges.

Turning to FIG. 8A and FIG. 8B, graphs 802, 804 of test data showing the signal drift of various strain gauges are shown. Graph 802 of FIG. 8A represents the signal drift data of tests on a number of strain gauges configured in accordance with the subject technology, while graph 804 of FIG. 8B represents the signal drift of prior art strain gauges. To generate the data, a hot soak test was performed at 140 degrees Celsius for 300 hours on powered strain gauges. As can be seen, the signal drift of prior art strain gauges (graph 804) at times approached 6.00% by the $8^{th}$ day of testing. By contrast, the error of all strain gauges of the subject technology (graph 802) was less than 0.2% at the $8^{th}$ day. Overall, the new design reduced signal drift by an average of approximately 95%.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., electronics, input and output sources, connection pads, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. An apparatus for sensing a pressure of a fluid from a fluid medium comprising:
 a port body having a peripheral wall surrounding an interior channel for receiving the fluid from the fluid medium, the interior channel extending between the fluid medium and a diaphragm on the port body;
 a strain gauge affixed to the port body by a glass substrate, the strain gauge comprising: a first resistor electrically connected between a first input/output (I/O) pad and a ground pad; a second resistor electrically connected between a second I/O pad and the ground pad; a third resistor electrically connected between a third I/O pad and the ground pad; and a fourth resistor electrically connected between a fourth I/O pad and the ground pad;
 four current sources, each current source providing a uniform, constant current to one of the I/O pads;
 a first output electrically connected between the first I/O pad and the second I/O pad for measuring voltage; and
 a second output electrically connected between the third I/O pad and the fourth I/O pad for measuring voltage,
 wherein:
 each resistor is spaced substantially equidistant from the ground pad to urge uniform mobile ion accumulation across the resistors; and
 when the diaphragm experiences pressure from the fluid: the second resistor and the third resistor experience a tension force; and the first resistor and fourth resistor experience a compression force.

2. An apparatus for sensing a pressure of a fluid from a fluid medium comprising:
 a port body having a peripheral wall surrounding an interior channel, the interior channel extending between a diaphragm on the port body and an opening for receiving the fluid; and
 a strain gauge disposed on the port body comprising: a first resistor electrically connected between a first input/output (I/O) pad and a ground pad; a second resistor electrically connected between a second I/O pad and the ground pad; a third resistor electrically connected between a third I/O pad and the ground pad; and a fourth resistor electrically connected between a fourth I/O pad and the ground pad,
 wherein each resistor is substantially equidistant from the ground pad to reduce mobile ion migration.

3. The apparatus of claim 2 wherein a uniform input is applied through each resistor simultaneously.

4. The apparatus of claim 2 wherein:
 the first I/O pad and the second I/O pad are disposed on a first side of the ground pad; and
 the third I/O pad and the fourth I/O pad are disposed on a second side of the ground pad.

5. The apparatus of claim 4 wherein the I/O pads and the ground pad are arranged in a parallel row.

6. The apparatus of claim 2 wherein the resistors are piezoresistive elements.

7. The apparatus of claim 2 wherein:
 the first resistor and the fourth resistor are positioned adjacent to the peripheral wall and the second resistor and the third resistor are positioned adjacent to the diaphragm, such that fluid in the interior channel causes the first and fourth resistors to experience compression while the second and third resistors experience tension.

8. The apparatus of claim 2 wherein the first resistor and the fourth resistor are symmetrical to the second resistor and the third resistor about a lateral axis passing through the I/O pads.

9. The apparatus of claim 2 wherein:
 the ground pad is elongated along a longitudinal axis; and
 the first resistor and the second resistor are symmetrical about the longitudinal axis to the fourth resistor and the third resistor.

10. An apparatus for sensing a pressure of a fluid from a fluid medium comprising:
 a strain gauge comprising: a first resistor electrically connected between a first input/output (I/O) pad and a ground pad; a second resistor electrically connected between a second I/O pad and the ground pad; a first output electrically connected between the first I/O pad and the second I/O pad; a third resistor forming a first resistor pair with the second resistor; and a fourth resistor forming a second resistor pair with the first resistor, wherein,
 wherein:

the first and second resistors are spaced from the ground pad to urge uniform mobile ion accumulation across the first and second resistors: and the first resistor pair and the second resistor pair are symmetrical about a lateral axis.

11. The apparatus of claim 10 wherein the resistors are spaced substantially equidistant from the ground pad.

12. The apparatus of claim 10 wherein a constant current is applied through the first resistor and the second resistor, the constant current being uniform.

13. The apparatus of claim 12 wherein:

the constant current is applied to the first resistor via the first I/O pad;

the constant current is applied to the second resistor via the second I/O pad; and the output measures a change in voltage between the first I/O pad and the second I/O pad.

14. The apparatus of claim 13 wherein the first I/O pad, the second I/O pad, and the ground pad are aligned along a lateral axis, the first resistor and the second resistor being symmetrical about the lateral axis.

15. The apparatus of claim 10 wherein a constant voltage is applied through the first resistor and the second resistor, the constant voltage being uniform.

16. The apparatus of claim 10 wherein the strain gauge further comprises:

the third resistor electrically connected between a third I/O pad and the ground pad;

the fourth resistor electrically connected between a fourth I/O pad and the ground pad; and a second output electrically connected between the third I/O pad and the fourth I/O pad.

17. The apparatus of claim 16 further comprising a port body defining an interior channel for receiving the fluid from the fluid medium, wherein the strain gauge is disposed on the port body.

18. The apparatus of claim 17 wherein the port body is conductive and grounded.

19. The apparatus of claim 17 wherein:

the first resistor and the fourth resistor are positioned adjacent to a peripheral wall of the port body surrounding the interior channel such that fluid in the channel causes the first resistor and the fourth resistor to experience a compression force; and the second resistor and the third resistor are positioned adjacent to a diaphragm within the port body, the diaphragm being exposed to the interior channel, such that fluid in the channel causes the second resistor and the third resistor to experience a tension force.

20. The apparatus of claim 16 wherein:

the first resistor and the second resistor form a first resistor pair;

the third resistor and the fourth resistor form a second resistor pair; and the first resistor pair and the second resistor pair are symmetrical about a longitudinal axis.

* * * * *